United States Patent
Marchioro

[11] Patent Number: 6,142,100
[45] Date of Patent: Nov. 7, 2000

[54] WATER AND/OR LIQUID FOODSTUFF DISPENSER FOR SMALL PETS

[75] Inventor: Domenico Marchioro, Isola Vicentina, Italy

[73] Assignee: Marchioro S.p.A. Stampaggio Materie Plastiche, Isola Vicentina, Italy

[21] Appl. No.: 09/307,604

[22] Filed: May 10, 1999

[30] Foreign Application Priority Data

May 13, 1998 [IT] Italy ................................ PD980053 U

[51] Int. Cl.[7] ...................................................... A01K 7/06
[52] U.S. Cl. ...................... 119/54; 119/51.5; 119/72.5; 119/75; 119/77; 119/464; 119/475; 119/454; 119/456
[58] Field of Search ............................. 119/51.5, 54, 72.5, 119/75, 77, 464, 475, 454, 456

[56] References Cited

U.S. PATENT DOCUMENTS

| | | |
|---|---|---|
| D. 337,863 | 7/1993 | Bowell . |
| 3,646,955 | 3/1972 | Olde . |
| 3,734,063 | 5/1973 | Atchley . |
| 3,887,165 | 6/1975 | Thompson . |
| 4,254,795 | 3/1981 | Smith . |
| 4,338,884 | 7/1982 | Atchley et al. . |
| 4,393,813 | 7/1983 | Sou . |
| 4,403,570 | 9/1983 | Freehafer . |
| 4,406,253 | 9/1983 | Atchley et al. . |
| 4,421,060 | 12/1983 | Frush et al. . |
| 5,003,927 | 4/1991 | Thompson . |
| 5,245,951 | 9/1993 | Nicholson . |
| 5,884,798 | 3/1999 | Mock et al. . |

*Primary Examiner*—Charles T. Jordan
*Assistant Examiner*—Daniel J. Beitey
*Attorney, Agent, or Firm*—Guido Modiano; Albert Josif; Daniel O' Byrne

[57] ABSTRACT

A water and/or liquid foodstuff dispenser for small pets which comprises a container having, at a bottom thereof, a dispensing device which is constituted by a tubular element arranged at an obtuse angle with respect to a longitudinal extension of the container, with a flanged tang which is hermetically connected to the container, and is provided with a free end which is perimetrically folded inwards and internally provided with a flow control element which is pushed closed by a spring, a stem of the control element protruding outside the free end.

22 Claims, 2 Drawing Sheets

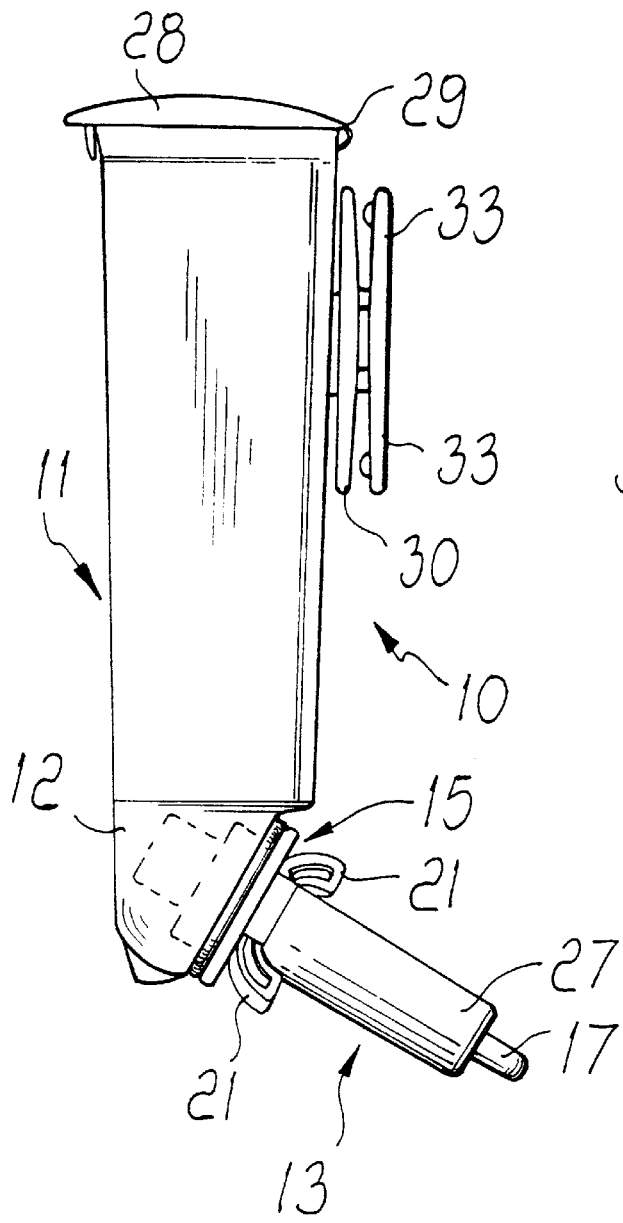
Fig. 1
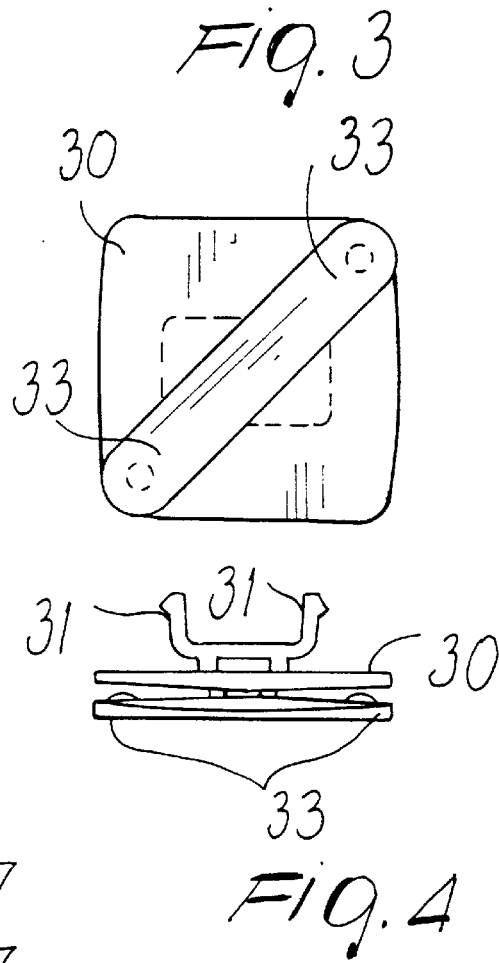
Fig. 3
Fig. 4
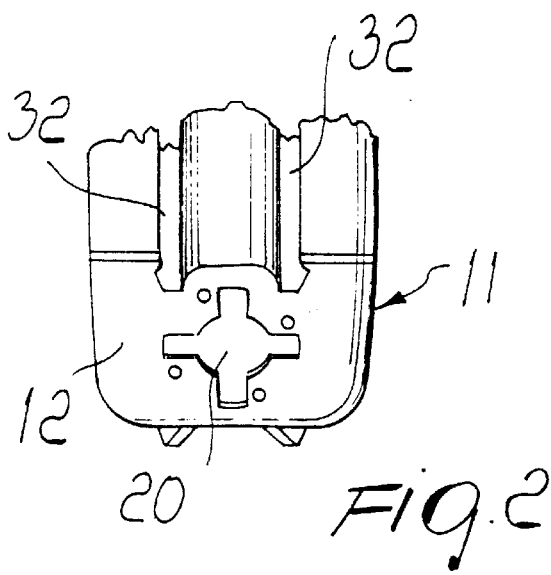
Fig. 2

WATER AND/OR LIQUID FOODSTUFF DISPENSER FOR SMALL PETS

BACKGROUND OF THE INVENTION

The present application claims priority of Italian Utility Model Application No. PD98U000053.

The present invention relates to a water and/or liquid foodstuff dispenser for small pets.

It is known that pets, usually small ones, kept in cages or similar confinement structures, are currently particularly popular.

In order to ensure optimum living conditions to these pets, various devices have been conceived for dispensing liquid foodstuffs, particularly water, and feeds.

In particular, in order to harmonize the time requirements of the owners of the pets with the needs of said pets as regards drinking, which is often frequent, water and/or liquid foodstuff dispensers have been conceived which can be substantially used by the pets without the aid of a human being.

Such dispensers are in fact provided in such a manner that the pet quickly learns to use them.

Nowadays, despite the variety of models commercially available, the structure of conventional dispensers is substantially constituted by a container which is associated, at its bottom, with a dispensing device which also acts as plug for the container.

In particular, the dispensing device is substantially constituted by a tubular element which is often made of metal, is inclined with respect to the horizontal and is closed, at its free end, by a ball which remains in a closure position substantially by gravity.

When the pet is thirsty, it learns to push the ball up, thus achieving a flow of liquid.

However, although this solution is valid from a merely functional point of view, in practice the closure by means of the ball is not substantially effective from the point of view of hydraulic tightness.

Practical application has in fact shown that this type of dispenser is in fact subject to a continuous loss of liquid, which must be replenished frequently and often, by dripping into the cage when the pet is not drinking, soils the bottom of the cage.

Moreover, by closing the container at the bottom by means of the dispensing device, conventional dispensers, in order to be replenished with liquid foodstuff, must be removed from the cage or similar structure to be filled and then repositioned on the cage, with a considerable waste of time and a certain complexity of the operation.

SUMMARY OF THE INVENTION

The aim of the present invention is to provide a water and/or liquid foodstuff dispenser for small pets which solves the above drawbacks of conventional dispensers, particularly avoiding losses of liquid foodstuff when the pet is not drinking.

In relation to this aim, an important object of the present invention is to provide a dispenser whose use is very simple for pets.

Another object of the present invention is to provide a dispenser which considerably simplifies the operations for replenishing the liquid and/or water, without thereby requiring to remove it from the cage or other similar structure.

Another object of the present invention is to provide a dispenser which can be manufactured at competitive costs with respect to conventional dispensers, has a flexible structure as regards the different body shape of the pets for which it is meant and can also be applied to cages and similar structures that are already commercially available or even already in use.

Another object of the present invention is to provide a dispenser which can be manufactured with conventional technologies and equipment.

This aim, these objects and others which will become apparent hereinafter are achieved by a water and/or liquid foodstuff dispenser for small pets, characterized in that it comprises a container having, at a bottom thereof, a dispensing device which is constituted by a tubular element arranged at an obtuse angle with respect to a longitudinal extension of the container, with a flanged tang which is heretically connected to said container, and provided with a free end which is perimetrically folded inwards and is internally provided with a flow control element which is pushed closed by a spring, a stem of said control element protruding outside said free end.

BRIEF DESCRIPTION OF THE DRAWINGS

Further characteristics and advantages of the present invention will become apparent from the description of an embodiment thereof, illustrated only by way of non-limitative example in the accompanying drawings, wherein:

FIG. 1 is a side view of a dispenser according to the invention;

FIG. 2 is a front view of a detail of the dispenser of FIG. 1;

FIG. 3 and 4 are respectively a front and a plan view of the coupling means adapted to couple the dispenser to a cage; in particular, FIG. 3 is a view taken from the right of FIG. 1 and FIG. 4 is a plan view of FIG. 3;

DESCRIPTION OF THE PREFERRED EMBODIMENTS

Figure 5:
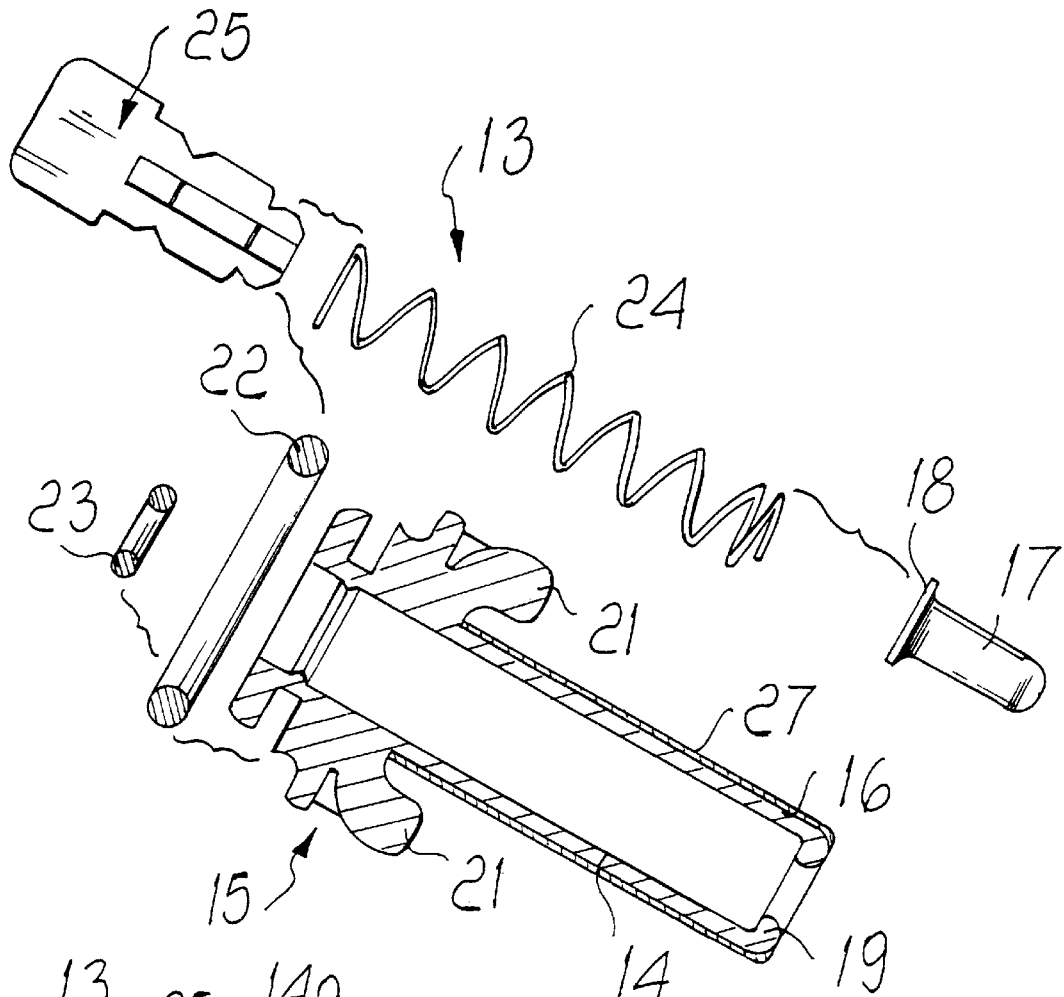
FIGS. 5 and 6 are respectively a partially sectional exploded view and a sectional view of a further detail of the dispenser of FIG. 1.
Figure 6:
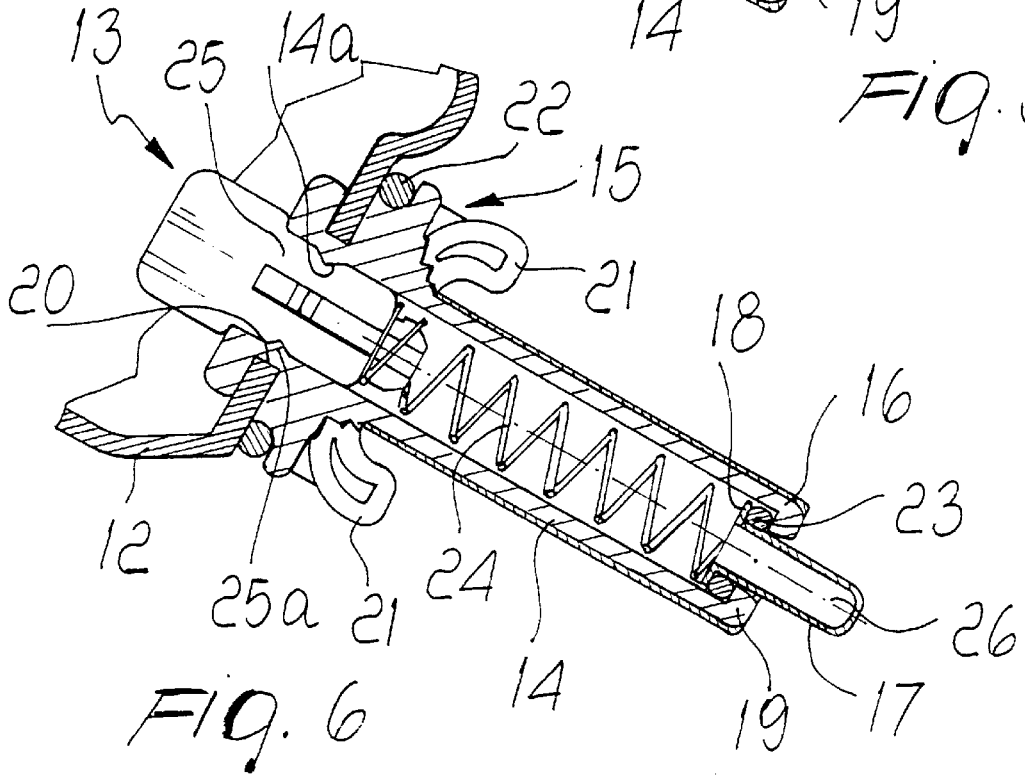

With reference to FIGS. 1 to 6, a water and/or liquid foodstuff dispenser for small pets, according to the invention, is generally designated by the reference numeral 10.

The dispenser 10 comprises a container 11 with which, at the bottom 12, a dispensing device 13 is associated; the dispensing device is constituted by a tubular element 14 which is arranged at an obtuse angle with respect to the longitudinal extension of the container 11 and in this case is made of plastics, with a flanged tang 15 which is hermetically connected to container 11.

The tubular element 14 has a free end 16 which is perimetrically folded inwards and is internally provided with a flow control element 18, for example mushroom-shaped, which is pushed closed by a spring 24.

The stem 17 of said control element protrudes outside free end 16.

The control element 18 normally rests internally on the perimetric fold 19 of the free end 16.

Tang 15 is detachably associated with the container 11 by means of a bayonet coupling.

The tang 15 is in fact cross-shaped and is inserted in a complementarily shaped hole 20 formed in the bottom 12 of the container 11, and can rotate so as to be offset with respect to the edges that form said hole 20 so as to provide the connection.

The tang 15 is also provided with two mutually opposite radial and external tabs 21 which are adapted to form push levers for the user when locking and releasing device 13 with respect to the container 11.

The tang 15 is also associated with first sealing means, which in this case are constituted by an annular gasket 22 made of elastomer which is arranged between the tang and the bottom 12 of said container 11.

The control element 18 is associated with second sealing means, which in this case are also constituted by an annular gasket 23 made of elastomer, which surrounds the stem 17 and abuts against the perimetric fold 19.

The helical spring 24 is interposed so as to push between the control element 18 and a base element 25 which is detachably fixed to the tubular element 14 at the end thereof that lies inside the container 11.

The base element is in fact provided with external slots 25a mating with a raised portion 14a which protrudes circumferentially from the internal wall of the tubular element 14.

The element 25, in particular, has a substantially cross-shaped transverse cross-section and forms, together with the tubular element 14, in this case four openings, not shown in the Figures, for the flow of the liquid.

The dispenser 10, in this case, has a sheath 27 fitted on said tubular element 14 in order to protect it.

The tubular sheath 27, which can conveniently also be extracted, is in fact made of metallic material and ensures the resistance of the dispensing device 13 when it is applied for example to cages that contain rodents.

The container 11 is open in an upward region.

In particular, in this embodiment it is provided with an openable cover 28.

In particular, in this case the container 11 is made of plastics and the hinge is constituted by a film 29 which is made of the same plastics and is monolithic with the container 11 and with the cover 28, which is thus produced by the same molding operation.

The container 11 is also provided with means for coupling to the cage or similar structure, not shown, that accommodates the pet.

In particular, the coupling means are constituted by a coupling plate 30 with wings 31 which are shaped like a partial hook; each wing can be detachably inserted in mutually opposite lateral regions of a corresponding vertical slot 32 which has edges shaped so as to form sealing undercuts and is provided in the container.

The plate 30 also has laminas 33 for anchoring to the cage or similar structure.

In practice it has been observed that the present invention has solved the intended aim and objects.

In fact, the particular coupling of the tube with a control element which is kept pushed by the spring at the perimetric fold of the outer end of said tube ensures a perfect seal when the pet is not drinking.

The spring is meant to increase the closure force, which would be too small due to the low intrinsic weight of the control element and to the fact that the tubular element is inclined and therefore only a component thereof bears onto the perimetric fold.

The control element, in association with the sealing gasket, gives assurance against any leakage of liquid.

However, the mechanics for opening the tube and therefore for accessing the flow of liquid are particularly simple and easy to learn for any kind of pet.

It should also be noted that the upper opening of the container allows to very simply replenish the liquid or water contained therein and that said replenishment operation does not entail removing the container from the frame to which it is applied.

It is also noted that all the components that constitute the dispenser according to the invention can be disassembled very easily, ensuring easy work in case of any maintenance.

It should also be noted that the constructive simplicity of the present invention allows competitive production costs with respect to conventional dispensers.

It is also possible to provide a wide range of longitudinal dimensions of the pin, ensuring optimum configurations for any kind of pet.

The present invention is susceptible of numerous modifications and variations, all of which are within the scope of the inventive concept.

The technical details may be replaced with other technically equivalent elements.

The materials and the dimensions may be any according to requirements.

The disclosures in Italian Utility Model Application No. PD98U000053 from which this application claims priority are incorporated herein by reference.

What is claimed is:

1. A water and/or liquid foodstuff dispenser for small pets, comprising a container having, at a bottom thereof, a dispensing device which is constituted by a tubular element arranged at an obtuse angle with respect to a longitudinal extension of the container, with a flanged tang which is hermetically connected to said container, and provided with a free end which is perimetrically folded inwards and is internally provided with a flow control element having a stem protruding out side said free end, said flow control element being pushed closed by a spring, wherein said tang is detachably associated with said container by means of a bayonet coupling.

2. The dispenser according to claim 1, wherein said tang is cross-shaped and is inserted in a complementarily shaped hole formed in the bottom of said container and is able to rotate so as to be offset with respect to edges that form said container bottom, so as to provide the connection.

3. The dispenser according to claim 1, wherein two mutually opposite radial and external tabs protrude from said tang during assembly and are adapted to form push levers for the user during locking and release of said dispensing device with respect to said container.

4. The dispenser according to claim 1, wherein said tang is provided with first hydraulic sealing means which are constituted by an annular gasket made of elastomer and arranged between said tang and said bottom of said container.

5. The dispenser according to claim 4, wherein said flow control element is provided with second hydraulic sealing means, constituted by an annular gasket made of elastomer which surrounds said stem and abuts against said end which is perimetrically folded.

6. The dispenser according to claim 1, wherein said spring is interposed between said control element and a base element which is detachably fixed to said tubular element at the end of said tubular element that lies inside said control container, said control element being shaped so as to form one or more openings for the passage of the liquid.

7. The dispenser according to claim 1, wherein said control element is detachably fixed inside said tube and has external grooves which couple to a raised portion which protrudes circumferentially from an internal wall of said tubular element.

8. The dispenser according to claim 1. further comprising a metallic tubular sheath for the external protection of said tubular element, which is made of plastics.

9. The dispenser according to claim 1, wherein said container has an open top.

10. The dispenser according to claim 1, wherein said container is provided, in an upward region, with an openable cover.

11. The dispenser according to claim 9, wherein said cover is hinged along one side of the container with a film hinge.

12. A water and/or liquid foodstuff dispenser for small pets, comprising a container having, at a bottom thereof, a dispensing device which is constituted by a tubular element arranged at an obtuse angle with respect to a longitudinal extension of the container, with a flanged tang which is hermetically connected to said container, and provided with a free end which is perimetrically folded inwards and is internally provided with a flow control element having a stem protruding out side said free end, said flow control element being pushed closed by a spring a first hydraulic sealing means are provided with said tang and are constituted by an annular gasket made of elastomer which is arranged between said tang and said bottom of container.

13. The dispenser according to claim 12, wherein said tang is detachably associated with said container by means of a bayonet coupling.

14. The dispenser according to claim 12, wherein said tang is cross-shaped and is inserted in a complementarily shaped hole formed in the bottom of said container and is able to rotate so as to be offset with respect to edges that form said container bottom, so as to provide the connection.

15. The dispenser according to claim 12, wherein two mutually opposite radial and external tabs protrude from said tang during assembly and are adapted to form push levers for the user during locking and release of said dispensing device with respect to said container.

16. The dispenser according to claim 12, wherein said flow control element is provided with second hydraulic sealing means, constituted by an annular gasket made of elastomer which surrounds said stem and abuts against said end which is perimetrically folded.

17. The dispenser according to claim 12, wherein said spring is interposed between said control element and a base element which is detachably fixed to said tubular element at the end of said tubular element that lies inside said control container, said control element being shaped so as to form one or more openings for the passage of the liquid.

18. The dispenser according to claim 12, wherein said control element is detachably fixed inside said tube and has external grooves which couple to a raised portion which protrudes circumferentially from an internal wall of said tubular element.

19. The dispenser according to claim 12, further comprising a metallic tubular sheath for the external protection of said tubular element, which is made of plastics.

20. The dispenser according to claim 12, wherein said container has an open top.

21. The dispenser according to claim 12, wherein said container is provided, in an upward region, with an openable cover.

22. The dispenser according to claim 21, wherein said cover is hinged along one side of the container with a film hinge.

* * * * *